United States Patent [19]
McAlister et al.

[11] 3,756,086
[45] Sept. 4, 1973

[54] PROPULSION SYSTEM

[76] Inventors: Roy E. McAlister, 5285 N. Red Rock Dr., Phoenix, Ariz. 85018; Theodore J. McAlister, Jr., Giscome, B.C., Canada

[22] Filed: July 28, 1970

[21] Appl. No.: 58,981

[52] U.S. Cl. .................................................. 74/84
[51] Int. Cl. ............................................. F16h 27/04
[58] Field of Search ............................. 74/84, 84 S

[56] References Cited
UNITED STATES PATENTS

| | | | |
|---|---|---|---|
| 3,584,515 | 6/1971 | Matyas | 74/84 S |
| 1,953,964 | 4/1934 | Laskowitz | 74/84 |
| 2,636,340 | 4/1953 | Llamozas | 74/84 UX |
| 3,555,915 | 1/1971 | Young, Jr. | 74/84 |

*Primary Examiner*—Milton Kaufman
*Attorney*—Cushman, Darby & Cushman

[57] ABSTRACT

Method and apparatus for generating a thrust for use in any environment where thrust is desired as for example for propelling a device whereby the force which moves the device is supplied by the movement inside the device of a mass along a curvilinear path. Since a mass following a curvilinear path necessarily produces a force tending to accelerate the mass toward an instantaneous center of curvature and that force is equal to the mass, expressed in slugs, times the radius, in feet, times the angular velocity squared, in radians/sec., periodic variation of mass, radius or angular velocity of a mass moving in a closed path produces an uncompensated force in a given direction with resultant tendency for movement in that direction. A number of different devices, including devices which utilize the atmosphere being travelled through to interact cyclically with eccentric rotors to produce acceleration and deceleration of the rotor, devices which expel a propulsive fluid after interaction with the rotor to produce cyclic acceleration and deceleration, and devices which produce thrust by cyclic acceleration and deceleration of eccentric rotors through interaction with natural or artifically applied magnetic, electric or thermal gradients, are disclosed.

4 Claims, 5 Drawing Figures

Patented Sept. 4, 1973 3,756,086
2 Sheets-Sheet 1
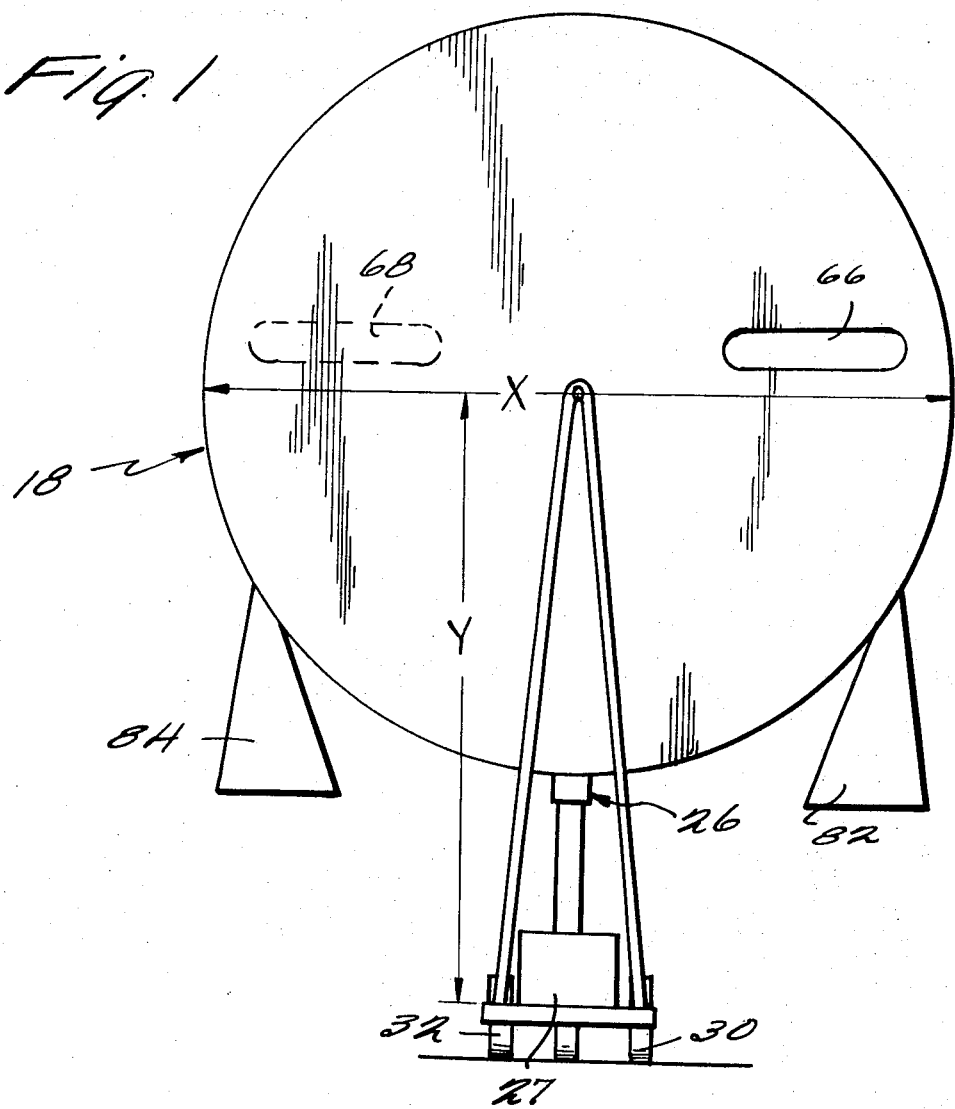
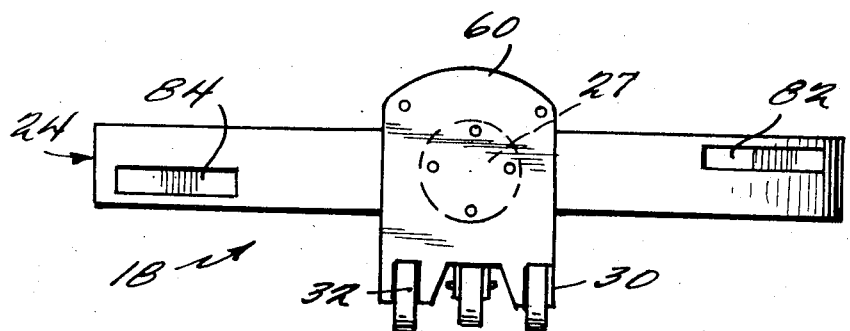
INVENTORS
ROY E. McALISTER
THEODORE E. McALISTER, JR.
BY Cushman, Darby & Cushman
ATTORNEYS INVENTORS
ROY E. McALISTER
THEODORE E. McALISTER, JR.

BY
Cushman, Darby & Cushman
ATTORNEYS

PROPULSION SYSTEM

BRIEF DESCRIPTION OF THE PRIOR ART AND SUMMARY OF THE INVENTION

The invention relates to a propulsion system which directs the movement of a mass along a curvilinear path to produce a net, uncompensated force to cause movement in a given direction.

Machines which move mass are the heart of the modern technological society and without such machines, civilization in its current form could not possibly endure. Carrying people, manufactured goods, and controlling the environment within which modern man exists, these machines are for the most part simple variations or modifications of old, and for the most part ancient, devices and also, unfortunately, responsible for many of the problems of modern society. The present invention relates to a totally new propulsion apparatus and method which is totally different from existing devices and, at least in certain circumstances, is a substantial improvement over them.

The invention is based upon the very simple and well-known principle that a mass following a curvilinear path necessarily accelerates toward the instantaneous center of curvature. As is well known, this acceleration is equal to the instantaneous radius of curvature times the square of the angular velocity, i.e. $a = r\omega^2$, with the acceleration $a$ normally expressed in ft./sec.$^2$, $r$ the radius, expressed in feet and $\omega$, the angular velocity, expressed in radians/sec.

Moreover, Newton's fundamental expression that $F = ma$, where $F$ equals the force, for example expressed in pounds $m$ the mass expressed in slugs, and $a$ the acceleration in feet/sec., suggests that a mass following a curvilinear path exerts an instantaneous force continually and if that force is not compensated for then the accelerating mass will move in response to the force.

For a constant mass moving in a closed path such as a circle at a constant speed each instantaneously created force vector is compensated for exactly at each point on the circular path of travel by another equal and opposite force exerted after an additional half revolution of travel. Hence at the end of one rotation, the mass necessarily returns to its initial position. If, however, the mass, the radius of curvature or the angular velocity of the rotating mass is altered periodically, then the force applied at some given points during a revolution will not be totally compensated for 180° later and that uncompensated force will necessarily cause movement of the mass along the direction of the uncompensated force. Thus by periodically altering the mass, the radius of movement, or the angular velocity of a rotating mass, that mass, and whatever is attached to it, can be moved in any given direction, as selected by the portion of the rotation during which the force produced is maximized and the portion during which is minimized.

The net force derived from this novel propulsion system may be expressed as follows:

$$F_n = 2N \int_m \int_r \int_\omega \omega \, dm \, dr \, d\omega$$

where

- $N$ is the effective number of gyrating members.
- $m$ is the instantaneous effective mass which may be a function of an angular displacement $\theta$.
- $\theta$ is a measure of the angular displacement (measured in radians from a frame of reference fixed to the device employing the McAlister propulsion system.
- $r$ is the effective radius of gyration of the rotating eccentric and may be a function of $\theta$.
- $\omega$ is the angular velocity expressed in radians per second and may be a function of $\theta$.

Therefore it follows that maximization of the net force ($F_n$) for systems of limited maximum radius of gyration ($r$) and of limited maximum massiveness ($m$) is accomplished by variation of the angular velocity ($\omega$) which becomes a squared term ($\omega^2$) by integration. Relatively small cyclic changes in the angular velocity at average velocities between 10,000 and 100,000 rpm become quite large when squared. The following table illustrates the net derivable force for a system having three rotating eccentrics having an effective total mass of one-eighth slug (approximately the mass exerting 4 1bf. when weighed), a radius of gyration of 1 foot, and being linearly accelerated for 180° and linearly decelerated for 180° to the tabulated hypothetical maximum and minimum angular speeds.

| Nominal speed, r.p.m. | Maximum $\omega$, rad./sec.$^{-1}$ | Minimum $\omega$, rad./sec.$^{-1}$ | $\Delta\omega, \omega_H - \omega_L$, rad./sec.$^{-1}$ | $\omega_H^2 - \omega_L^2$, rad.$^2$/sec.$^{-2}$ | Maximum $F_n$ at $\theta=0$, $F_n=1/8 (1)$ $(\omega_H^2-\omega_L^2)$ net lbf.=m $(acc_{nH}-acc_{nL})$ |
|---|---|---|---|---|---|
| 10,000 | 1,050 | 930 | 120 | 237,600 | 29,700 |
| 20,000 | 2,100 | 2,045 | 55 | 227,975 | 28,500 |
| 30,000 | 3,150 | 3,110 | 40 | 250,400 | 31,300 |
| 40,000 | 4,200 | 4,170 | 30 | 251,100 | 31,400 |
| 50,000 | 5,240 | 5,218 | 22 | 230,100 | 28,800 |
| 60,000 | 6,290 | 6,273 | 17 | 213,600 | 26,700 |
| 70,000 | 7,355 | 7,340 | 15 | 220,400 | 27,600 |
| 80,000 | 8,380 | 8,367 | 13 | 217,700 | 27,200 |
| 90,000 | 9,430 | 9,418 | 12 | 226,200 | 28,300 |
| 100,000 | 10,500 | 10,489 | 11 | 230,900 | 28,900 |

A number of specific methods and apparatus for accomplishing this cyclic variation of one of the three factors which bear upon the force produced are detailed in the specification below, but many additional ways of carrying out this basic principle will be apparent to anyone after consideration of the examples set forth. Since, for many applications, the wobble, which necessarily results from the coupling forces produced if only a single rotating mass is employed is undesirable it can be eliminated by employing two or more masses which are rotated together in a manner so that the coupling forces produced are cancelled but the forces in the desired direction of motion are additive. Of course, if it is desired to produce a device which does not move but which instead produces a torque, it is quite possible, as discussed below, to construct a device whereby the forces favoring motion are cancelled while the moments are added to produce a torque which can be applied to a shaft or used in any other way.

One simple way to produce linear motion is to spin two or more rotors having their center of mass located remote from their center of rotation, and spinning the rotors in opposite directions in the same plane so that the moments produced by the two masses at all times cancel. If the rotors are alternately accelerated and decelerated together, then the rotors and anything attached to them will tend to move in the direction in which the force is produced while the masses are accelerating, as the forces produced during acceleration will exceed in magnitude the opposing forces produced during deceleration.

Even further, to complement or replace a cyclical change in velocity, a fluid, such as the atmosphere through which the device is travelling, can be permitted enter and interact with the rotating members during a portion of the cycle of rotation so that the center of mass shifts during rotation and consequently the forces produced during rotation on half the cycle do not completely cancel the opposing forces produced during the other half resulting in a net force and movement in one direction on the other. Even further, magnetic and electrical forces can be employed to accelerate or decelerate the rotors.

BRIEF DESCRIPTION OF THE DRAWINGS

FIG. 1 shows a top view of a model of the embodiment whereby two rotors are rotated in opposite directions and cyclically accelerated and decelerated;

FIG. 2 shows a rear view of the embodiment of FIG. 1;

DETAILED DESCRIPTION OF THE DRAWINGS

Figure 3:
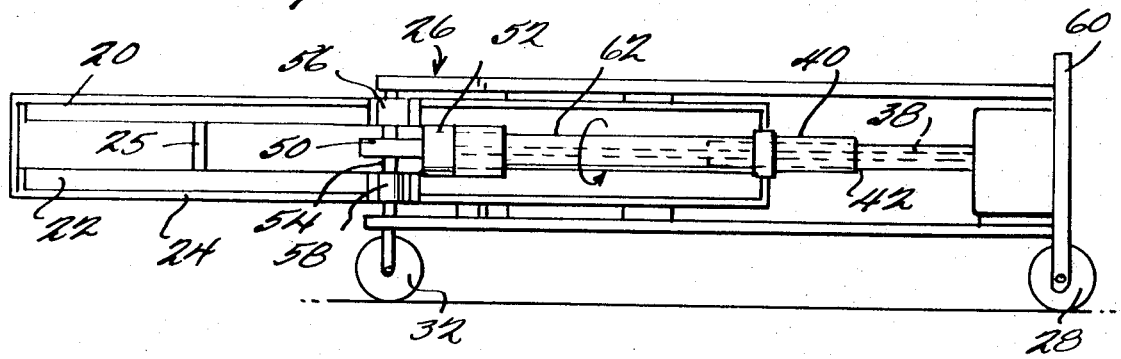
FIG. 3 shows a cut-away side view of the embodiment of FIG. 1.

Reference is now made to the FIGS. 1-3 which show an embodiment of the invention which has actually been constructed and operated as a model. In this embodiment, two rotors 20 and 22, which are preferably indentical, are rotated in opposite directions as discussed below, and are cyclically accelerated and decelerated to provide a net force in any chosen direction to cause movement of the device 18 as desired.

The two rotors 20 and 22 are mounted within a stationary vacuum housing 24, which provides at least a partial vacuum for the reasons disclosed below, for rotation about a shaft 25. A conventional frame 26 which need only be strong enough to provide rigid support and mechanical stability for the device 18 helps support the motor 27, which spins the two rotors 20 and 22 about shaft 25, as well as the other elements connecting the motor 27 to the rotors 20 and 22 as developed below. In the model constructed, the frame 26 was made from two old table leg supports of 1020 steel. Three wheels 28, 30 and 32 are attached to frame 26 in the embodiment shown in FIGS. 1-3 and are of conventional type. In the model actually constructed, plastic wheels which had steel pin bearings to permit free rotation about an axle and which were not driven in any way were used. It is obvious that the embodiment shown in FIGS. 1-3 can, when sufficient thrust is developed, move unaided through the air as well as along the ground on the wheels 28, 30 and 32. The wheels 28, 30 and 32 were provided primarily to test the capability of the device 18 as a land vehicle.

The motor 27 connects to the rotors 20 and 22 through a shaft 38 which may be held in place if necessary by any conventional means such as supporting bracket 40 shown in FIG. 3. An aluminum tube 42 is also provided about the shaft 38 to furnish additional protection against damage and hold the shaft 38 firmly in place. The bracket 40 is bolted to the frame 26 by any suitable means and in the embodiment shown in FIG. 3, conventional bolts are employed. The shaft 38 may be constructed to store potential energy cyclically in a coil spring and is connected to a differential 50 through a suitable bearing 52 and shafts 54 and 55, driven by the differential 50, connect to two bearings 56 and 58 which in turn drive rotors 20 and 22, respectively, in opposite directions.

The motor 27 may be any conventional type which is capable of driving the two rotors 20 and 22, but it is preferred that the rotors 20 and 22 be spun as rapidly as possible to maximize the speed diffrential over a single rotation and hence the force which is used to propel the device. A Lamb electrical motor I.S. 14750, 115V 60Hz, 20,000 RPM Universal, which is a type commonly used in vacuum cleaners, was successfully employed. Of course, any means for rotating the rotors 20 and 22 can be used, and it is contemplated that electric motors, gas turbines, pulse jets, two and four cycle piston engines, Sterling engines, ion acceleration engines, fly-wheel storage systems and others will all prove useful in certain applications. One particularly suitable rotating means is described in a copending application by Roy E. McAlister, Jr. Ser. No. 58,934, filed July 28, 1970 entitled "Vapor Pressurized Hydrostatic Drive," filed concurrently herewith. In the embodiment shown in FIG. 3, a support frame 60, which was constructed of three-eighths inch thick aluminum plate, was used to support the motor 27 and the motor 27 may, if desired, be thoroughly bolted to the plate 60, which in turn is connected to frame 26.

Further, a helical spring drive 62 is disposed along the shaft 38 between the motor 27 and the bearing 52. This spring drive 38, which is a simple spring, stores potential energy during the part of the cycle of rotation and then releases it during another part so that the motor 27 can be driven at a constant speed while the two rotors 20 and 22 are cyclically accelerated and decelerated.

Figure 4:
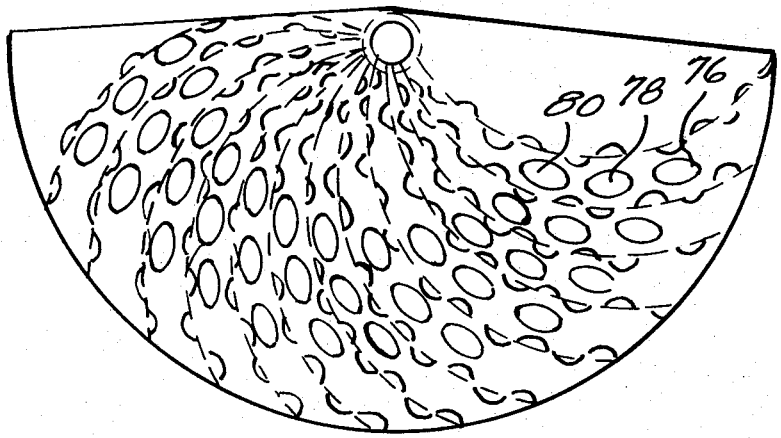
FIG. 4 shows a top view of one of the rotors from the embodiment of FIG. 1.
Figure 5:
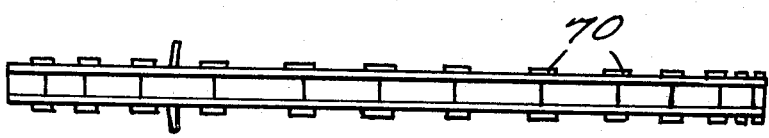
FIG. 5 shows a side view of one of the rotors of FIG. 1.

The particular structure shown in FIGS. 4 and 5 for the rotors 20 and 22, which are constructed as identical, is simply two thin sheets, for example, of one-sixteenth inch aluminum, bolted together with small tabs which have been termed impeller tabs. One such tab is labeled 70 and shown in FIG. 5. These tabs simply serve to hold the two sheets together and to form a unitary rotor. If desired, the rotors 20 and 22 may be constructed with weights so that the center of mass does not coincide with the center of rotation to add additional force to that provided by the propulsive fluid as discussed below. However, in the embodiment actually constructed, the rotors 20 and 22, were not so weighed and the center of mass roughly coincided with the center of rotation.

As mentioned above, the interior of the vacuum housing 24, within which the rotating rotors 20 and 22 are moving, is preferably kept at a partial vacuum, for example, by a vacuum pump or any other suitable device which may be mounted within the frame 26 or provided exterior to frame 26. Even further, slots in the vacuum housing 24 are a first intake port 66 on the top of the housing 24 and a second intake port 68 on the bottom of housing 24. Cut on one side of the rotors 20 and 22 as shown in FIG. 5 are a number of inlet ports, three of which are labeled 76, 78 and 80. When the moving rotor, for example, rotor 20, brings the inlet ports of the rotor 20 such as ports 76, 78 and 80 into alignment with the intake port 66, air passes into the rotor 20 to temporarily shift the center of mass away from the center of rotation. This alignment occurs while rotor 20 is accelerating and also at the same time the holes in rotor 22 are aligning with port 68 and rotor 22 accelerating. When the inlet ports move out of alignment with the port 66, no further air is admitted and the center of mass shifts back to the center. Rotors 20 and 22 are decelerating during the half revolution in which no air is admitted. The result of this periodic mass shift and accelerating and deceleration is, of course, an uncompensated force produced by each rotor.

As shown, air is pulled through the rotor ports, including ports 76, 78 and 80, which were made on one side of the rotor 20 and the opposite for the rotor 22, and the air moves through the partially exacuated housing 24 through or along the rotor, for example rotor 20, in an arc or "super parabolic" arc as it has been described. After it reaches the outer edge of the rotor 20, for example, the air moves out through an exhaust port 82 which is shown in FIGS. 1 and 2. Likewise, air introduced and associated with the lower rotor 22 moves out of an exhaust port 84, also shown in FIGS. 1 and 2.

This propulsive fluid, which in the constructed model was simply the atmosphere, is then accelerated by the spinning rotor 20 and vacuum after entering the intake ports 66 and 68 to a terminal velocity and then expelled through exhaust ports 82 and 84 roughly Pi radians, or 180°, later. Thus, for half a revolution this propulsive fluid provides an additional mass on one side of each side of the rotors 20 and 22 which further shifts the center of mass away from the center of rotation and causes in effect a net force to be produced which causes motion in the direction of that net force. During the other half of the revolution no air is admitted and the center of mass shifts back to the center of rotation. Two rotors moving in opposite directions are employed in this embodiment so that no moment or couple about the center of rotation results from the shift of mass center for each rotor and the center of mass of both rotors together does not move. The device 18 will accordingly move roughly in a straight line.

When a model according to the embodiment shown in FIGS. 1-5 was constructed, the dimension labelled X in FIG. 1 was made to be roughly 12 inches while the Y dimension was made 13 inches. The total weight of the device was found to be about 8 pounds, 2 ounces, and when a motor of the type described above was used to drive the rotors 20 and 22, a total thrust of about 10 pounds was recorded. Accordingly, it should be apparent that such a thrust was not only sufficient to drive the self-contained model 18 along the ground on the wheels 28, 30 and 32, but could actually lift the device 18 vertically.

The advantages and benefits of this unique propulsion system will be readily apparent. First, the system can be completely self-contained and closed with no energy input into the device necessary nor any external effect on the environment of the device produced.

Since no atmosphere to "push" against is necessary for a vehicle employing this propulsion system, such a vehicle can operate equally well within and without the earth's atmosphere. Moreover, such a vehicle would produce no pollutants to poison the atmosphere, would operate soundlessly and would be easily maneuverable in three dimensions. Lifting vertically upward at any speed, hovering indefinitely and moving both horizontally and vertically could be simply accomplished by adjusting the plane of rotation of the rotors. Since no communication with the ground is necessary to move along the ground or land or sea the vehicle can without any modification move vertically in the air.

Even further, the extreme simplicity of this device, especially in comparison to other systems such as a gasoline engine, ensures that it will operate virtually trouble free and will be necessarily inexpensive to operate, maintain and construct. Moreover, the propulsion system can be constructed relatively small and lightweight with all the attendant economic and structural advantages. The total weight, of course, depends on the optimum speed of revolution offered by the primary power source. Relatively slow sources such as piston engines will require speed increasing transmissions while high speed electric motors and turbines offer almost ideal operating speeds and accordingly require essentially no weight increase.

A number of operational advantages for such a vehicle are also expected. For example, clutches and flywheels are not needed as the starting load consists only of bearing friction and inertia of the rotating parts, not the full inertia of the vehicle. Full operation speed may be attained before variation of the radius, angular velocity or mass is initiated if desired. Further, the primary power source may be allowed to operate at essentially constant speeds by utilization of torque shafts, springs or other members which convert rotational kinetic energy to torsional displacement potential energy (elastic displacement) cyclically during the rotor's acceleration and deceleration.

The ease in maneuvering such a vehicle should also be apparent. Changing the direction of thrust in the plane of motion is simply a matter of changing the angular intervals of acceleration and deceleration of the rotors or altering the cycle of any other of the features varied. Thus, guidance and reversed thrust may be accomplished without the necessity of extra propulsive control appendages such as flaps, spoilers, stabilizers or clam shells. Altitude control may be effected by utilization of coupled forces derived by making the angular intervals of acceleration and deceleration in two rotors at parallel planes (maximized by greatest separation) opposite for like rotating members, and alike for oppositely rotating members.

It should be pointed out that the energy for driving the masses cyclically in any of the ways described above can be supplied from any source. In addition to the arrangements described above using traveling wave explosion fronts to cause cyclic acceleration and deceleration of eccentric rotors where the explosions are contained within guiding shrouds and employing superconductors to carry electricity to accelerate and decelerate rotors or cause phase changes are two other alternatives.

It should be emphasized that this invention finds utility not only for propelling a vehicle but in any machine which employs thrust to operate. This invention can be used to move rods, spin shafts and rotate devices to list a few possibilities and the list of applications extends to any device which employs a thrust for any purpose.

Even further, it is contemplated that some of these constructions will be combined to improve efficiency and power.

Many changes and modifications of the embodiment will be clear to anyone of ordinary skill in the art, and accordingly the scope of the invention is intended to be limited only by the scope of the attached claims.

What is claimed is:

1. A method of moving a machine comprising the steps of:

moving a part and a fluid medium within said machine along a curvilinear path so that said part accelerates toward an instantaneous center of curvature; and cyclically increasing and decreasing the mass of said fluid medium to change the magnitude of the acceleration toward the center of curvature so as to produce a net force on said machine in a given direction to cause said machine to move in that given direction including expelling at least a portion of said fluid medium from said machine after said net force has been produced.

2. A method as in claim 1 wherein the step of changing includes the step of cyclically increasing and decreasing the radius of gyration of said fluid medium.

3. A method of propelling a machine comprising the steps of:

spinning a pair of rotors mounted within said machine in opposite directions in parallel planes so that the coupling moments produced by one of said rotors is instantaneously cancelled by the coupling moments produced by the other of said rotors; and alternately accelerating and decelerating said rotors to produce a net force in a given direction and resultant motions in said given direction including the step of causing fluid to flow through a portion of each of said rotors during part of a cycle equal in length to the time or a multiple thereof required to complete said interval of rotation so that a second net force in said given direction is produced.

4. A method as in claim 3, wherein at least two rotors are mounted in the same plane.

* * * * *